United States Patent
Tippett et al.

(10) Patent No.: US 8,741,790 B2
(45) Date of Patent: Jun. 3, 2014

(54) PTFE/FIBERGLASS COMPOSITE FOR USE AS A CONVEYOR BELT

(75) Inventors: John W. Tippett, New Boston, NH (US); Stephen W. Tippett, Bedford, NH (US)

(73) Assignee: Textiles Coated Incorporated, Manchester, NH (US)

(*) Notice: Subject to any disclaimer, the term of this patent is extended or adjusted under 35 U.S.C. 154(b) by 498 days.

(21) Appl. No.: 13/211,384

(22) Filed: Aug. 17, 2011

(65) Prior Publication Data

US 2012/0058326 A1 Mar. 8, 2012

Related U.S. Application Data

(60) Provisional application No. 61/380,734, filed on Sep. 8, 2010.

(51) Int. Cl.
*B65G 15/38* (2006.01)
*B32B 27/32* (2006.01)

(52) U.S. Cl.
CPC ............................... *B32B 27/322* (2013.01)
USPC .......................................... 442/289; 428/102

(58) Field of Classification Search
CPC .... B65G 15/38; B32B 5/02; B32B 2262/101; B32B 2255/02; B32B 2433/02; B32B 2255/26; B32B 27/322; B32B 27/12; B32B 17/04; B32B 7/04; B32B 5/24; B32B 5/022; B32B 5/024; B32B 5/026
USPC ......... 198/844.1, 848; 428/99, 102, 105, 131, 428/137, 220, 221, 223, 297.4, 299.4; 442/64, 65, 286, 287, 289, 394, 395, 442/396

See application file for complete search history.

(56) References Cited

U.S. PATENT DOCUMENTS

| | | | |
|---|---|---|---|
| 3,542,633 A | 11/1970 | Goldsmith | |
| 3,790,403 A | 2/1974 | Ribbans, III | |
| 5,141,800 A * | 8/1992 | Effenberger et al. | 442/261 |
| 7,745,355 B2 * | 6/2010 | Spohn et al. | 442/289 |

FOREIGN PATENT DOCUMENTS

WO 2006026042 A1 3/2006

OTHER PUBLICATIONS

International Preliminary Report on Patentability mailed on Mar. 21, 2013 for International Application No. PCT/US2011/048019, 6 pages.
International Search Report issued on Oct. 7, 2011 for International Application No. PCT/US2011/048019, 10 pages.

* cited by examiner

*Primary Examiner* — Arti Singh-Pandey
(74) *Attorney, Agent, or Firm* — Gesmer Updegrove LLP

(57) ABSTRACT

A PTFE/fiberglass composite for use as a conveyor belt comprises a fiberglass fabric having oppositely facing surfaces. The fabric has a structure defining a substantially uniform pattern of openings extending from one to the other of its major surfaces, with the average area of the individual openings being at least about 0.20258 mm². PTFE films are laminated to the major surfaces of the fabric. The laminated films are interconnected by fluoropolymer ties extending through the fabric openings and are adhered to the major surfaces with a peel strength of between about 5-13 pli. The composite has a thickness of less than about 20 mils and a fiberglass content of less than about 25%.

8 Claims, 1 Drawing Sheet

PTFE/FIBERGLASS COMPOSITE FOR USE AS A CONVEYOR BELT

PRIORITY

The present application claims the benefit of U.S. Provisional Patent Application No. 61/380,734 filed on Sep. 8, 2010, which is incorporated herein in its entirety.

FIELD OF THE INVENTION

This invention relates to PTFE/fiberglass composites useful as conveyor belts in various industrial applications, a primary example being the processing of foods at elevated temperatures.

BACKGROUND DISCUSSION

Conveyor belts made from PTFE resins are used in many applications around the world. PTFE offers excellent chemical resistance properties, high temperature capabilities, and good release characteristics.

Because many of the applications rely on heat being transferred through the belts, belt thicknesses are preferably kept to a minimum. Thicknesses typically range from as low as 5 mils to possibly as high as 20 mils. The lower thicknesses are particularly critical in food applications, where often the conveyor belts are operating at temperatures as high as 500° F. to fully process the food.

PTFE/fiberglass composites are popular conveyor belts used in food service. Fiberglass, a high modulus and high temperature material, offers very high strength properties at thin dimensions.

The large majority of PTFE/fiberglass conveyor belts in food cooking applications fall in a thickness range of around 10 mils. A typical construction consists of a 6 mil woven fiberglass fabric combined with PTFE resins. The PTFE resins are almost always applied as coatings, but may also be applied as some combination of coatings and laminated films.

While it is well understood that PTFE/fiberglass composites bring many advantages to the conveying of food products, experience has shown that in many industrial applications these advantages are offset by serious drawbacks. For example, the high modulus fiberglass material does not stretch. As a result, most PTFE/fiberglass conveyor belts possess little elongation, which causes belt tracking problems.

Secondly, because fiberglass is brittle, it is vulnerable to mechanical damage. As a result, in belting applications, a high safety factor in fiberglass material is typically used to ensure a successful operation. As a specific example, in a belting application where the required tensile strength for the conveyor belt may range between 5-10 lbs/inch of width (pli), it is not unusual to find a fiberglass reinforcement with a tensile strength measuring in the hundreds of pli. The additional strength is needed for the belt to survive the mechanical stresses encountered in food processing operations over a long term. The mechanical stresses may result from the hard pressing of flour materials, the scraping of food particles, etc.

Also, the limited adhesion of the PTFE to the fiberglass reinforcement is a weak link for the belt life of the composites in food service. Historically, PTFE/fiberglass belting materials have limited adhesion or peel strength ratings for the PTFE-fiberglass interface of less than 5 pli, typically as low as 2 pli.

Finally, fiberglass is vulnerable to chemical attack by many of the materials used in food preparation and cooking. In the production of the food products on the nominal 10 mil PTFE/fiberglass belting material, some form of hot oil or grease typically comes in contact with the PTFE surface as the food is being cooked. Over time, the hot oil is able to penetrate into the interior of the composite due to the inevitable punctures or holes that develop in the PTFE surfaces during the conveying/cooking operation. History has shown that the processing grease or oil is a chemical threat to the fiberglass reinforcement. Once the hot oil reaches the glass fibers, the conveyor belt typically begins to undergo a serious deterioration in performance.

A 10 mil PTFE/fiberglass conveyor belt in food service generally reveals that it has reached a terminal condition when the PTFE coating/film has lifted from the fiberglass surface in the form of a bubble or blister. Mechanical stresses generated between the PTFE and the fiberglass, as the belting material is being conveyed, certainly contribute to surface abnormalities. However, it is believed that another culprit is the weakening adhesion between the woven fiberglass and the PTFE surface, which is being compromised due to chemical attack of the fiberglass by hot grease. As the bond between the PTFE surface and the fiberglass weakens, the PTFE lifts from the fiberglass, which enables the formation of the blister.

The actual mechanism for forming a blister likely entails the hot oil and its fluid components developing a vapor or gas phase during the cooking operation. The conveyor belt, as it makes a cycle, travels from the hot cooking zone to a cooler non-cooking zone. Any fluids residing within the interior of the belting material will elevate in temperature as they travel through the cooking zone and then cool as they leave the cooking zone. The temperature cycling will generate an expansion/contraction in the belting material profile as the hot fluids contained in the belt begin to boil and expand as vapor. Accordingly, the PTFE surface, which at this point is now serving to confine the fluids within the belt interior, will experience stress from the expanding fluids. The end result is delamination of the PTFE surface from the fiberglass reinforcement and blister formation. It is generally at this point that the conveyor belt is taken off the food cooking machine.

Over time, many attempts have been made to overcome the shortcomings of thin PTFE/fiberglass composites used in conveyor belt service. Special PTFE coatings with superior surface durability have been used to improve the life of the conveyor belts. PTFE films have been laminated to the fiberglass carcass in an effort to provide better resistance to the penetration of the grease and oil chemicals used during cooking.

Modest improvements have been achieved in conveyor belt life on occasions. However, the fundamental tracking and adhesions problems have continued to prevail. The chemical attack of the fiberglass reinforcement also remains as a major problem, in part because of the relatively large amounts of fiberglass that are required for manufacturing the thin, lightweight, belting, materials.

Of late, as disclosed in U.S. Pat. No. 7,673,742, the disclosure of which is herein incorporated by reference, an all-PTFE material has been developed to serve as a conveyor belt for processing food. While the all-PTFE material has provided very significant benefits over certain PTFE/fiberglass belting materials, it has come up short in a number of food processing applications.

For example, the all-PTFE material does not possess the high strength properties of woven fiberglass. Also, conveyor belts made solely from PTFE resins are more likely to have problems maintaining flat, uniform, conveying, surfaces in food production. The stretching of the PTFE material will typically produce some irregular surface features under load and temperature. While many food cooking plants, such as chicken plants, can easily accommodate these surface irregularities, which often include wrinkles, for example, other food processing plants cannot accept the resulting impressions caused by the wrinkles or surface distortions. Thus, for those facilities relying on a very stable, relatively flat PTFE conveyor belt, the all-PTFE conveyor belt is not a candidate.

When foods are cooked by being conveyed through ovens or other like high temperature environments, the process dictates that heat must be transferred through PTFE/fiberglass composite. Thus, the composite must be relatively thin, with most thicknesses ranging between 5-20 mils, and preferably between 10-15 mils. The composite must lay somewhat flat and be free of severe wrinkles and other major defects. It must be strong enough to convey a load, which can vary dramatically from service to service, ranging from a typical 3 to 5 pli to as high as possibly 10 pli. It must be able to withstand exposure to severe pressing and puncturing forces. These and other factors tend to limit the number of raw materials that can be considered for the PTFE/fiberglass conveying belts used in food cooking applications.

The most popular woven fiberglass reinforcement used in the typical food applications is a style commonly referred to in the industry as "7628". The 7628 style weighs about 6 oz/sq yd and has a thickness of 6 mils. The PTFE surface in a PTFE/fiberglass composite delaminates when the adhesion or peel strength between the PTFE and the woven fiberglass becomes very low. For the style 7628 fabric, the maximum adhesion typically generated between the PTFE surface and the fiberglass substrate typically ranges around 2 pli. Style 128, another 6 oz/sq yd product, is a somewhat similar style of woven fiberglass that is capable of supporting slightly higher adhesion levels. However, because style 128 is substantially more expensive than style 7628, it is less frequently used, even though it offers the possibility of a higher adhesion.

What can be definitely concluded is that the adhesion levels of the PTFE/fiberglass composites currently being employed in food processing applications are not sufficiently high for the extended belt life that most food processors would like to achieve. Those woven fiberglass styles that have the potential of providing for higher PTFE/glass adhesions are typically too thick and heavy to serve in food processing applications. Woven fiberglass styles that are thinner and lighter in weight than styles 7628 and 128 often result in low adhesion levels or are not generally considered adequate due to poor mechanical properties.

Finally, the two main styles, 7628 and 128, consist of tightly woven fiberglass fabrics. In addition to allowing for limited bonding strength to PTFE resins, these fabrics offer no elongation capabilities of any consequence. So, when put into service in belting applications, both products can be very difficult to track on food processing machines.

It will be seen, therefore, that there remains a need for an improved PTFE/fiberglass belting material that: is relatively thin in order to accommodate efficient heat transfer; has the ability to remain adequately flat and stable; is capable of conveying the loads encountered in food service applications; has high adhesion of its PTFE surfaces to the fiberglass fabric; and, has critical elongation properties.

The objective of the present invention is to provide a novel PTFE/fiberglass belting material that meets all of these requirements.

SUMMARY OF THE INVENTION

In accordance with the present invention, a PTFE/fiberglass composite for use as a conveyor belt is prepared by providing a fiberglass fabric having oppositely facing major surfaces. The fabric has a structure defining a substantially uniform pattern of openings extending from one to the other of its major surfaces. The average area of the individual openings is at least about 0.20258 mm$^2$, with the fiberglass content being less than about 25% and preferably less than about 9-13.2% of the composite. PTFE films are applied to the major surfaces of the fiberglass fabric. The PTFE films are interconnected by fluoropolymer ties extending through the fabric openings, and are adhered to the major fabric surfaces with a peel strength of between about 5-13 pli.

The resulting PTFE composite may be characterized additionally by an elongation under tensile stress of between 1.0 to 5.0%, and by a thickness of less than about 20 mils and preferably less than about 11-14 mils.

The PTFE films may be selected from the group consisting of cast films, extruded films, skived films and dry fibrillated films as disclosed in U.S. Pat. No. 7,211,210, the description of which is herein incorporated by reference.

The fluoropolymer ties may be produced by coating the fiberglass fabric with dispersions of fluoropolymers selected from the group consisting of PTFE, modified PTFE, PFA, MFA and FEP.

The fiberglass fabric may be made from fibers or yarns and may either be woven, nonwoven, knitted, felted or wet laid.

These and other features and attendant advantages of the present invention will now be described in further detail with reference to the accompanying drawings, wherein:

DETAILED DESCRIPTION

Figure 1:
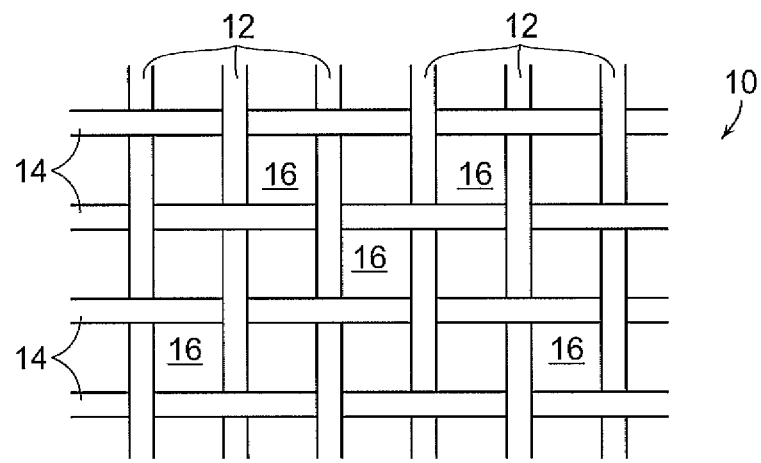
FIG. 1 is a plan view of a typical woven fiberglass fabric useful in the present invention, with dimensions exaggerated for purposes of disclosure.
Figure 2A:
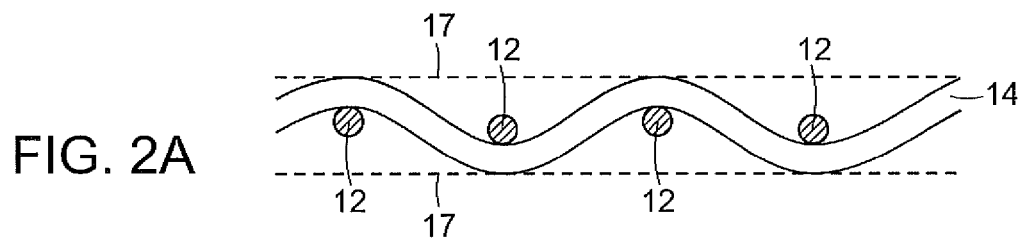
FIGS. 2A-2C are cross sectional views through an exemplary embodiment of a PTFE fiberglass composite in accordance with the present invention, showing different stages in its production, and again with dimensions exaggerated for purposes of disclosure.

With reference initially to FIGS. 1 and 2A, a typical fiberglass fabric useful as a component of a PTFE/fiberglass composite in accordance with the present invention is shown at 10. The fabric has a woven structure with warp and fill yarns respectively designated at 12 and 14. As shown, the yarns are arranged in a pattern defining rectangular openings indicated typically at 16, It is to be understood, however, that the present invention is not limited to fabrics with this particular woven structure. Woven fabrics having different structures, as well as fabrics that are non woven, knitted, felted or wet laid may also be useful, provided that their structures define a substantially uniform pattern of openings between their fibers or yarns, and that the openings having an average area within the range herein claimed. The fabric has oppositely facing major surfaces 17.

Figure 2B:
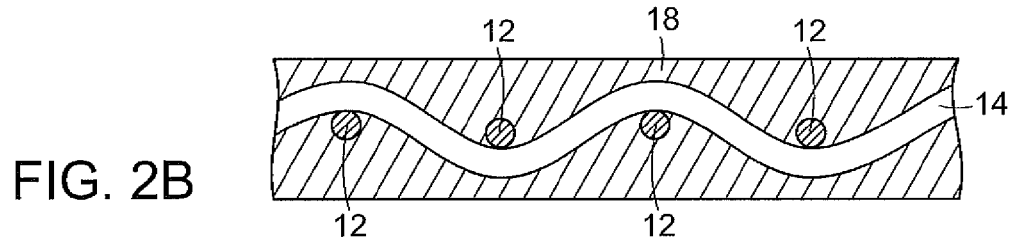

As shown in FIG. 2B, and in accordance with the present invention, the fabric 10 is coated on both surfaces 17 with a fluoropolymer dispersion 18. The fluoropolymer of the dispersion is preferably PTFE, and the PTFE is preferably although not necessarily sintered during the coating operation. Other suitable fluoropolymer candidates include modified PTFE, PFA, MFA and FEP. The fluoropolymer dispersion is applied in a manner and in such quantities as to coat the yarns 12, 14 and to fill substantially all the openings 16.

Figure 2C:
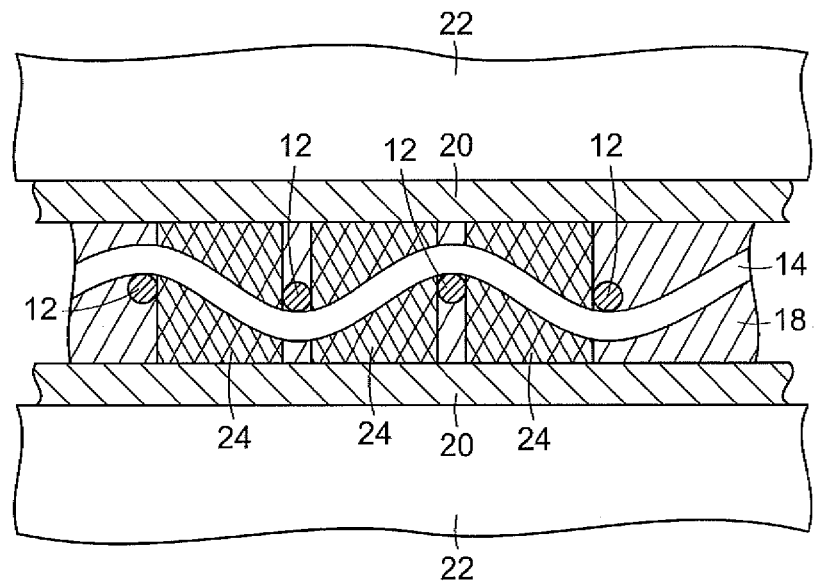

Next, and as shown in FIG. 2C, PTFE films 20 are laminated to the major fabric surfaces 17. The PTFE films may be either cast, extruded, skived or dry fibrillated, and may be sintered or unsintered prior to lamination. Lamination is achieved by confining the composite between heated platens 22. To effect lamination, it is necessary to bring the PTFE materials to their melting point, which ranges between 621-650° F. The platens are heated to temperatures ranging from 700-750° F. and are applied to the composite at pressures ranging from 40 to 80 psi and for resident times ranging from 0.75 to 1.25 minutes. The thus laminated composite is then allowed to cool from the elevated laminating temperatures, and in the course of doing so, is allowed to contract. Such contraction is beneficial in that it allows the composite to subsequently elongate when placed under tension in typical conveyor applications. In the resulting laminated composite structure, the PTFE films 20 are firmly adhered to the coated major surfaces 17 of the fabric 10, and are interconnected by fluoropolymer ties 24 extending through the fabric openings 16.

In order to resist delamination of the PTFE films 20 and to safeguard the fiberglass fabric 10 from exposure to cooking oils and the like in a food processing application, it has been determined that the PTFE films should be bonded to the major fabric surfaces 17 with a peel strength of between about 5-13 pli. In order to achieve this peel strength, the fabric openings 16 should have an average area of at least about 0.20258 mm$^2$ so that the fluoropolymer coating will produce ties 24 having the necessary strength to securely interconnect the PTFE films.

In addition, the fabric 10 should comprise less than about 25%, and preferably between 9-13% of the weight per unit area of the composite. At such reduced weight percentages, the fabric readily accommodates contraction of the PTFE films as the composite is cooled from elevated laminating temperatures. Contraction is sufficient to accommodate subsequent elongation of between about 1.0 to 5.0% when the composite is tensioned. In order to accommodate efficient heat transfer through the composite, its thickness should be less than about 20 mils, and preferably between about 11-14 mils.

The invention will now be further described by way of the following nonlimiting examples, with examples 2-7 and 9-14 describing composites of the present invention, and examples 1 and 8 and 15 and 16 describing non inventive composites presented for comparison purposes.

EXAMPLE 1

Style 7628 woven fiberglass from JPS Glass and Industrial Fabrics, Slater, S.C., was coated with PTFE dispersions, D-610N, from Daikin America, Orangeburg, N.Y. The fiberglass was in a griege state prior to coating. The dispersion was coated to a sintered condition in a vertical tower to a weight of 9.5 oz/sq yd. Unsintered, extruded, PTFE films, 3 mils in thickness, produced by Textiles Coated International, Manchester, N.H., were laminated to both sides of the coated style 7628 fabric in a laminator. (The films were positioned on the coated fabric such that the oriented direction of the extruded films pointed in the warp direction, or length direction, of the coated fabric. The laminator was operating at 725 F and 40 psi. The residence time was 36 seconds.

A strip of Kapton Polyimide film, E I Dupont, Wilmington, Del., was inserted between the coated fabric and the extruded film on one of the fabric's two surfaces prior to laminating. The Kapton was inserted to prevent the film from bonding to the coated fabric in a specific area.

Upon completion, the specimen consisted of a PTFE coated style 7628 fabric with extruded PTFE films bonded to both sides. On the side that was laminated with the Kapton film strip, a small area of the extruded film was not bonded to the coated fabric.

The laminated product had a final thickness of around about 11 mils. The weight of the product was 18.14 oz/sq yd. The fiberglass content of the product was 33%. The product laid very flat and contained a smooth surface.

A 1" strip was cut from the specimen. The strip was 10" in length. On one side of the strip, the extruded PTFE film was bonded to the entire surface. On the other side, the extruded PTFE film was bonded for 8" of the 10" length starting from one end of the strip. The remaining 2" of film was free and not bonded to the coated fabric. The free 2" film tail was contiguous to the 8" of bonded film residing on that side of the strip.

The specimen was placed in the jaws of a testing machine to measure the adhesion of the PTFE resins to the woven fiberglass reinforcement. The testing machine was an ADMET 5kN Tabletop Universal Testing Machine with digital controller. One jaw of the machine was clamped to the loose 2" film tail. The other jaw was clamped to that part of the specimen that would have normally been bonded to the 2" film tail if the Kapton film strip had not been inserted during laminating.

The machine was turned on and the two jaws began to move further apart at a speed of 5" per minute. The film immediately began to lift from the woven fiberglass surface. As the film separated from the woven fiberglass, it carried with it the coating on the woven fiberglass, exposing bare fiberglass surface. The adhesion measurements during the separation measured around 2 pli, which is very typical for style 7628-based PTFE/fiberglass composites. Low adhesion readings such as this lead to the development of blisters and other surface abnormalities in PTFE/fiberglass belting materials being used in many food processing operations.

EXAMPLE 2

Style 1620 woven fiberglass, supplied by BGF Industries, Inc., Greensboro, N.C., was coated with PTFE resins using D-610N dispersion. The fabric weighed 1.53 oz/sq yd and was in a griege state prior to coating. The plain weave fabric contained ECG 150 1/0 yarns in both the warp and fill directions. The yarn count was 20×20. The open area of the fabric was estimated to be around 25%. The fabric was coated to a sintered condition in a vertical tower to a finished weight of 3.5 oz/sq yd. The thickness of the coated product was about 0.003".

Unsintered, extruded, PTFE films, 4 mils in thickness, produced by Textiles Coated International, Manchester, N.H., were laminated to both sides of the coated style 1620 fabric in a laminator. (The films were positioned on the coated fabric such that the oriented direction of the extruded films pointed in the warp direction of the coated fabric). The laminator was operating at 725 F and 40 psi. The residence time was 36 seconds.

Kapton film was used during the lamination process in the same manner as described in Example 1.

The finished product had a thickness of about 9 mils. The weight was 14.7 oz/sq yd. The fiberglass content was 10.4%. The product laid flat and exhibited embossed surfaces.

A strip of the laminated product containing a free 2" film tail, as described in Example 1, was tested for adhesion strength. The bond strength ranged between 7 and 8 pli.

EXAMPLE 3

Style 1659 woven fiberglass, purchased from BGF Industries, Inc., Greensboro, N.C., was coated with PTFE resins using D-610N dispersion. The fabric weighed 1.60 oz/sq yd and was in a griege state. The leno weave fabric contains ECG 150 1/0 yarns in both the warp and fill directions. The yarn count is 20×10. The fabric was coated to a sintered condition in a vertical tower to a finished weight of 2.5 oz/sq yd. The thickness of the coated product is around 0.006".

Unsintered, extruded, PTFE films, 4 mils in thickness, produced by Textiles Coated International, Manchester, N.H., were laminated to both sides of the coated style 1659 fabric in a laminator. (As with the style 1620 PTFE coated fiberglass fabric, the films were positioned on the style 1659 coated fabric such that the oriented direction of the extruded films pointed in the warp direction of the coated fabric.) The laminator was operated at 725 F and 40 psi. The residence time was 36 seconds.

Kapton film was used during the lamination process in the same manner as described in Example 1.

The finished product had a thickness of around 10 mils. The weight was 12.1 oz/sq yd. The fiberglass content was 13.2%. The product laid reasonably flat and exhibited an embossed surface.

A strip of the laminated product containing a free 2" film tail, as described in Example 1, was tested for adhesion strength. The bond strength ranged between 8 and 9 pli.

EXAMPLE 4

The PTFE coated style 1620 woven fiberglass product produced in Example 2 was laminated with sintered cast PTFE films that were 4 mils in thickness. The cast PTFE films were produced by Textiles Coated International, Manchester, N.H. The laminator was operating at 725 F and 40 psi. The residence time was 36 seconds. Because the cast PTFE films did not contain an orientation, no special arrangement was required in laying the films out on the PTFE coated fiberglass fabric prior to laminating. A Kapton strip was used during the lamination process.

The finished product had a thickness of about 12 mils. The weight was 16.9 oz/sq yd. The fiberglass content was 9.0%. The product laid flat and exhibited a heavily embossed surface.

A strip of the laminated product containing a free 2" film tail, as described in Example 1, was tested for adhesion strength. The bond strength ranged between 5.0 and 6.5 pli.

EXAMPLE 5

The PTFE coated style 1659 woven fiberglass product produced in Example 3 was laminated with sintered cast PTFE films that were 4 mils in thickness. The cast PTFE films were produced by Textiles Coated International, Manchester, N.H. The laminator was operating at 725 F and 40 psi. The residence time was 36 seconds. Because the cast PTFE films did not contain an orientation, no special arrangement was required in laying the films out on the PTFE coated fiberglass fabric prior to laminating. A Kapton strip was used during the lamination process.

The finished product had a thickness that was around 14 mils. The weight was 15.94 oz/sq yd. The fiberglass content was 10.0%. The product laid reasonably flat and exhibited.

A strip of the laminated product containing a free 2" film tail, as described in Example 1, was tested for adhesion strength. The bond strength ranged between 5.0 and 6.0 pli.

EXAMPLE 6

The PTFE coated style 1620 woven fiberglass product produced in Example 2 was laminated with multiple plies of unsintered dry fibrillated films. Three dry fibrillated films produced by Textiles Coated International, Manchester, N.H., each 13 mils thick, were laid out on each side of the fabric. (The three plies, when laminated together, culminate in a product called LFP 2103 CrossFilm Industrial Product, which is manufactured by Textiles Coated International, Manchester, N.H.) The films were laid out at 120 degree angles. For each side of the fabric, one ply was laid in the warp direction of the fabric. The two additional plies were laid in a manner that created a uniform, 120 degree orientation. The assembly was laminated at 725 F and 40 psi. The residence time was 36 seconds. A Kapton strip was used during the lamination process.

The finished product had a thickness that ranged between 12 mils and 13 mils. The weight was 15.2 oz/sq yd. The fiberglass content was 10.0%. The product laid flat and exhibited a heavily embossed surface.

A strip of the laminated product containing a free 2" film tail, as described in Example 1, was tested for adhesion strength. The bond strength ranged between 11.0 and 13.0 pli.

EXAMPLE 7

The PTFE coated style 1659 woven fiberglass product produced in Example 3 was laminated with multiple plies of unsintered dry fibrillated films. Three dry fibrillated films, each 13 mils in thickness, were laid out on each side of the fabric. The films were laid out at 120 degree angles. For each side of the fabric, one ply was laid in the warp direction of the fabric. The two additional plies were laid in a manner that created a uniform, 120 degree orientation. The assembly was laminated at 725 F and 40 psi. The residence time was 36 seconds. A Kapton strip was used during the lamination process.

The finished product had a thickness that was about 11 mils. The weight was 14.2 oz/sq yd. The fiberglass content was 11.3%. The product laid reasonably flat and exhibited an embossed surface.

A strip of the laminated product containing a free 2" film tail, as described in Example 1, was tested for adhesion strength. The bond strength ranged between 7.5 and 11.0 pli.

EXAMPLE 8

The elongation of the laminated product produced in Example 1 was measured at room temperature. Loops of PTFE coated fiberglass fabric were heat sealed to the two ends of a 1"×14" strip of the laminated product. A metal rod was put through one loop and secured to a fixed support frame. The other loop was attached to a clamp on a hand digital device that measured stress or load in pounds. Two measuring lines that were 10" apart were marked on the 14" long strip of laminated product using a grease pencil.

Stress or load was placed on the strip by pulling on the hand digital device. The strip elongated as the stress was applied. When it was believed that a maximum amount of elongation was achieved, the distance between the two grease pencil marks were measured. The elongation amounted to about 0.3%. The stress that created the elongation was 32 lbs. Since the strip was 1" wide, the load was 32 lbs/in of width (pli).

EXAMPLE 9

Using the technique described in Example 8, the laminated product produced in Example 2 was measured for its elongation properties. At a load of 32 lbs, which appeared to achieve the maximum amount of stretch in the product, an elongation of 3% was achieved.

EXAMPLE 10

Using the technique described in Example 8, the laminated product produced in Example 3 was measured for its elongation properties. At a load of 32 lbs, which appeared to achieve the maximum amount of stretch in the product, an elongation of 3% was achieved.

EXAMPLE 11

Using the technique described in Example 8, the laminated product produced in
Example 4 was measured for its elongation properties. At a load of 32 lbs, which appeared to achieve the maximum amount of stretch in the product, an elongation of 2.5% was achieved.

EXAMPLE 12

Using the technique described in Example 8, the laminated product produced in Example 5 was measured for its elongation properties. At a load of 32 lbs, which appeared to achieve the maximum amount of stretch in the product, an elongation of 2.5% was achieved.

EXAMPLE 13

Using the technique described in Example 8, the laminated product produced in Example 6 was measured for its elongation properties. At a load of 32 lbs, which appeared to achieve the maximum amount of stretch in the product, an elongation of 3.5% was achieved.

EXAMPLE 14

Using the technique described in Example 8, the laminated product produced in Example 7 was measured for its elongation properties. At a load of 32 lbs, which appeared to achieve the maximum amount of stretch in the product, an elongation of 3.5% was achieved.

EXAMPLE 15

Style 1080 woven fiberglass, purchased from BGF Industries, Inc., Greensboro, N.C., was coated with PTFE resins using D-610N dispersion. The fabric weighed 1.38 oz/sq yd and was in a griege state prior to coating. The plain weave fabric contained ECG 450 1/0 yarns in both the warp and fill directions. The yarn count was 60×47. The fabric was coated to a sintered condition in a vertical tower to a finished weight of 4.1 oz/sq yd. The thickness of the coated product is about 3 mils.

Unsintered, extruded, PTFE films, 4 mils in thickness, produced by Textiles Coated International, Manchester, N.H., were laminated to both sides of the coated style 1080 fabric in a laminator. (The films were positioned on the coated fabric such that the oriented direction of the extruded films pointed in the warp direction of the coated fabric.) The laminator was operating at 725 F and 40 psi. The residence time was 36 seconds. Kapton film was used during the lamination process in the same manner as described in Example 1.

The finished product had a thickness of about 9 mils. The weight was 13.8 oz/sq yd. The fiberglass content was 10.0%. The product contained a number of creases due to the contraction of the PTFE films as they cooled exiting the laminator.

A strip of the laminated product containing a free 2" film tail, as described in Example 1, was tested for adhesion strength. The bond strength measured 4.5 pli.

EXAMPLE 16

Using the technique described in Example 8, the laminated product produced in Example 16, was measured for its elongation properties. At a load of 32 lbs, which appeared to achieve the maximum amount of stretch in the product, an elongation of 0.6% was achieved.

Data provided by examples 1-16 is summarized in the following table:

TABLE

| Examples | Opening Areas mm$^2$ | Adhesion (pli) | Elongation (%) | Thickness (mils) | Weight (oz/sq yd) | Fiberglass Content (%) |
|---|---|---|---|---|---|---|
| 1 and 8 | 0.01935 | 2.0 | 0.3 | 11 | 18.1 | 33.0 |
| 2 and 9 | 0.58064 | 7.0 to 8.0 | 3.0 | 9 | 14.7 | 10.4 |
| 3 and 10 | 4.12902 | 8.0 to 9.0 | 3.0 | 10 | 12.1 | 13.2 |
| 4 and 11 | 0.58064 | 5.0 to 6.5 | 2.5 | 12 | 16.9 | 9.0 |
| 5 and 12 | 4.12902 | 5.0 to 6.0 | 2.5 | 14 | 15.9 | 10.0 |
| 6 and 13 | 0.58064 | 11.0 to 13.0 | 3.5 | 13 | 15.2 | 10.0 |
| 7 and 14 | 4.12902 | 7.5 to 11.0 | 3.5 | 11 | 14.2 | 11.3 |
| 15 and 16 | 0.04129 | 4.5 | 0.6 | 3 | 13.8 | 10.0 |

It will be seen from the above that the areas of the openings in the fiberglass fabrics of examples 2-7 are significantly larger on average than the openings of the fiberglass fabrics of examples 1 and 15. The larger openings allow for the creation of stronger ties 24 when the fabrics are initially coated with the fluropolymer dispersions, and the stronger ties in turn contribute to significantly higher adhesions serving to reliably bond the PTFE films to the fiberglass substrate.

Fabrics with larger openings that also comprise a relatively low percentage of the content of the composites are also less resistant to contraction of the PTFE films during cooling following lamination. During such contraction, it is believed that the high modulus fiberglass fabric undergoes a slight crimping. When the composite is subsequently tensioned during a belting application, the crimped fiberglass fabric is stretched out as the elastomeric PTFE films expand, thus allowing the composite to elongate. Accordingly, the composites of examples 1 and 15, with fabrics having tightly woven structures and relatively small openings, display significantly lower elongations as compared to the composites of examples 2-7, which include more open fabric substrates.

We claim:

1. A PTFE/fiberglass composite for use as a conveyor belt, said composite comprising:
   a fiberglass fabric having oppositely facing major surfaces, said fabric having a structure defining a substantially uniform pattern of openings extending from one to the other of said major surfaces, with the average area of the individual openings being at least about 0.20258 mm$^2$; and
   PTFE films on the major surfaces of said fabric, said films being interconnected by fluoropolymer ties extending through said openings and being adhered to said major surfaces with a peel strength of between about 5-13 pli, said composite having a thickness of less than about 20 mils and a fiberglass content of less than about 25%.

2. The composite of claim 1 further characterized by an elongation of between about 1.0-5.0%.

3. The composite of claim 1 wherein said thickness is between about 11-14 mils.

4. The composite of claim 1 wherein said fiberglass content is between about 9-13.2%.

5. The composite of claim 1 wherein said PTFE films are selected from the group consisting of cast films, extruded films, skived films and cross film laminates.

6. The composite of claim 1 wherein the fluoropolymer of said ties is selected from the group consisting of PTFE, modified PTFE, PFA, MFA, FEP.

7. The composite of claim 1 wherein said fiberglass fabric is made from fibers or yarns.

8. The composite of claim 7 wherein said fabric is either woven, nonwoven, knitted, felted or wet laid.

\* \* \* \* \*